United States Patent [19]

Walton

[11] 4,187,503

[45] Feb. 5, 1980

[54] SUMP ALARM DEVICE

[76] Inventor: Robert G. Walton, 8415 Limerick, Wichita, Kans. 67206

[21] Appl. No.: 939,365

[22] Filed: Sep. 5, 1978

[51] Int. Cl.² ............................................. G08B 21/00
[52] U.S. Cl. ................................... 340/624; 340/602; 116/110
[58] Field of Search ............... 340/602, 603, 604, 607, 340/608, 612, 616, 618, 623, 624; 116/109, 110

[56] References Cited

U.S. PATENT DOCUMENTS

| 3,185,789 | 5/1965 | Gunther | 340/624 |
| 3,399,399 | 8/1968 | Apfelbaum | 340/620 |

Primary Examiner—Alvin H. Waring
Attorney, Agent, or Firm—Edwin H. Crabtree

[57] ABSTRACT

A sump alarm device adapted for mounting on a vertical pump shaft housing of a sump pump. The sump pump is disposed in a sump. The sump alarm device is activated when the water level in the sump rises above a predetermined level when the sump pump fails to operate due to loss of electrical power or a malfunction in the pump.

1 Claim, 3 Drawing Figures

SUMP ALARM DEVICE

BACKGROUND OF THE INVENTION

This invention relates generally to a float alarm device which is activated by a rising water level and more particularly, to a sump alarm device adapted for mounting on a sump pump which is received in a sump and used for pumping water therefrom.

Heretofore there have been a number of sump alarm devices such as the apparatus disclosed in U.S. Pat. No. 3,726,606 to Peters. Also alarm devices have been used in refrigerators and ice boxes for alerting the owner of the unit that water drip pans need to be drained. These devices are shown in U.S. Pat. No. 1,324,522 to Saltzman and U.S. Pat. No. 1,602,300 to Grant. More recently an alarm device has been used to sense sewage backup in a sewer line. This alarm device is disclosed in U.S. Pat. No. 3,774,187 to Windham. Also an alarm device for a drain system is disclosed in U.S. Pat. No. 3,185,789 to Gunther.

While the above prior art patents disclose various types of vertically mounted floats which are elevated by a rising water level and activate alarm devices, none of these devices disclose the specific structure and advantages of the subject invention used in conjunction with a sump pump.

SUMMARY OF THE INVENTION

The subject invention provides an early warning of a high water level in a sump due to power failure or mechanical failure of the sump pump in the sump. By providing an early warning, corrective action may be taken, thereby avoiding costly damage due to high water and flooding.

The sump alarm device is simple in design, rugged in construction, and is adaptable for mounting on various sizes and designs of standard sump pumps used in sumps. The device is adjustable for mounting along the length of the vertical pump shaft housing of the pump so that the device may be activated at a predetermined water level.

The device is battery operated so that an alarm will be sounded irrespective of loss of electrical power to the sump pump.

The sump alarm device which is adapted for mounting on a vertical pump shaft housing of a sump pump disposed in a sump includes a "U" shaped float rod guide having a vertical base with two outwardly extending horizontal arms. The horizontal arms include an upper arm and a lower arm having apertures therein for receiving a vertical float rod. The lower end of the rod is attached to a float which is suspended above the top of the water level in the sump. Should the sump fail to operate, the float contacts the rising water and raises the float rod as the water level rises in the sump. The base of the rod guide is attached to a screw clamp which is adapted for receipt around the vertical pump shaft housing. By loosening and tightening the screw clamp the height of the alarm device may be adjusted on the vertical pump shaft housing. A micro-switch having a switch lever is mounted to the upper arm of the rod guide. A switch lever trip is mounted on the float rod and disposed between the upper and lower arms of the rod guide. As the float rod rises in the sump the switch lever trip contacts the switch lever of the switch closing the switch. The switch is electrically connected to a battery operated alarm. The battery operated alarm is activated sounding the alarm when the switch is closed.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
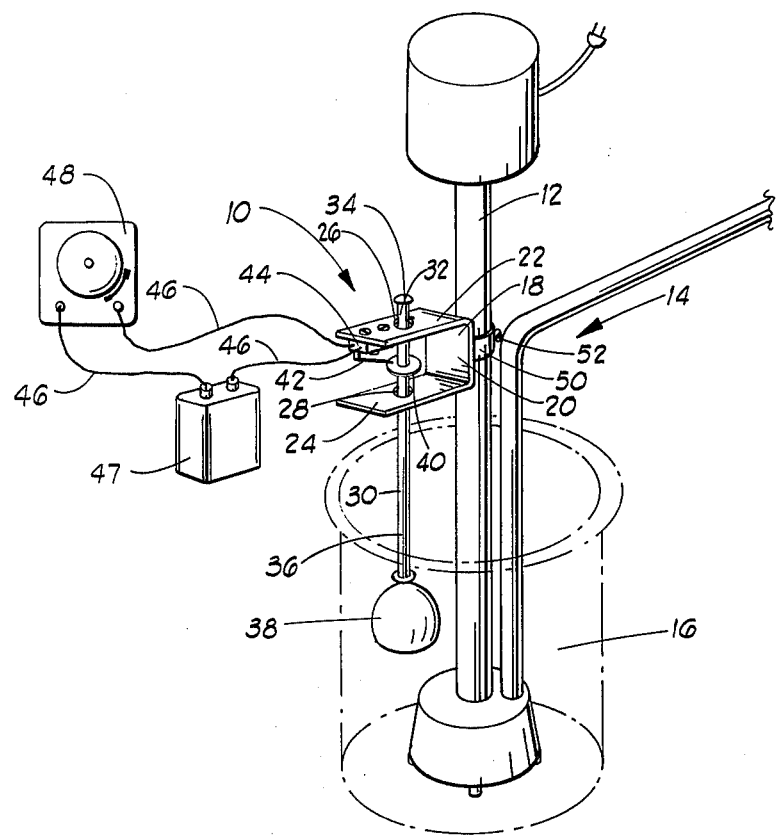
FIG. 1 is a perspective view of the sump alarm device mounted on a vertical pump shaft housing of a sump pump. In this view the sump pump can be seen received in a sump.

In FIG. 1 the sump alarm device is designated by general reference numeral 10. The device 10 is adjustably mounted on a vertical pump shaft housing 12 of a sump pump 14. The sump pump 14 is shown disposed in a sump 16 for pumping water therefrom. The sump pump 14 is a standard type of sump pump used for pumping water from a sump similar to the sump 16 and is turned on when a float is raised by the water level in the sump. The float for turning on the pump 14 is not shown in the drawings. During heavy thunderstorms and rain, electrical power is often discontinued thereby preventing an electric powered pump similar to the pump 14 from operating. Should there be heavy rains and flooding the water received in the sump 16 will quickly overflow causing flood damage. Also if there is a malfunction of the pump 14 the sump 16 will overflow without warning the operator of the sump pump 14. Therefore, by mounting the unique sump alarm device 10 on the vertical pump shaft housing 12 of the pump 14 the operator of the sump pump 14 will have an early warning of a rising water level in the sump 16. At this time precautions can be taken prior to the water level overflowing from the sump 16.

The alarm device 10 includes a "U" shaped float rod guide 18 having a vertical base 20, an upper horizontal arm 22 and a lower horizontal arm 24. The upper arm 22 and lower arm 24 include apertures 26 and 28 for slidably receiving a float rod 30 having an upper end portion 32 with a flange 34 therearound to retain the rod 30 on top of the upper arm 22. The rod 30 further includes a lower end portion 36 having a float 38 attached thereto. Disposed on the float rod 30 and between the upper arm 22 and lower arm 24 is a switch lever trip 40. The switch lever trip 40, when raised on the rod 30, contacts a switch lever 42 of a microswitch 44. The microswitch 44 is electrically wired by leads 46 to a battery 47 and battery operated alarm 48.

The "U" shaped float rod guide 20 is mounted on the vertical pump shaft 12 by a screw clamp 50 having a screw 52 for loosening and tightening the clamp 50 around the shaft 12. The clamp 50 provides means for adjusting the guide 20 along the length of the shaft 12 so that the device 10 may be activated at various water levels in the sump 16. While the screw clamp 50 is shown, a pair of nylon slip straps could be used equally well for mounting the guide 20 on the shaft 12. The slip straps are inexpensive, non-corrosive, and will not rust.

Figure 2:
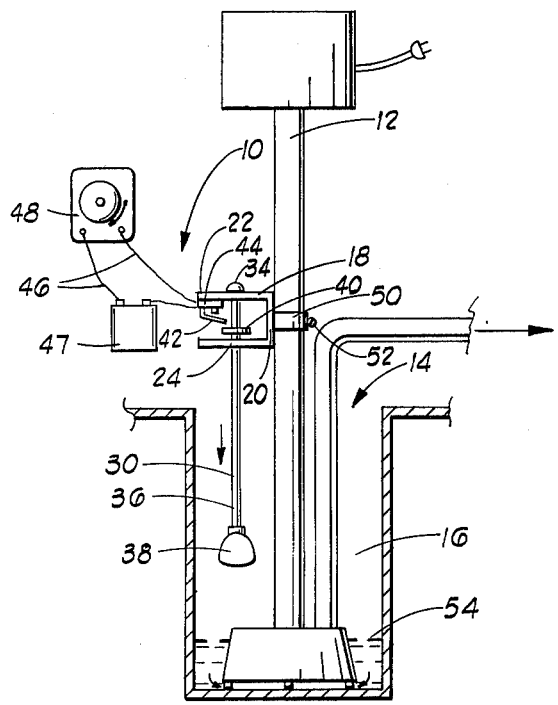
FIG. 2 is a side sectional view of the sump with the device mounted on the vertical pump shaft housing of the sump pump.

In FIG. 2 a water level 54 can be seen in the bottom of the sump 16. The sump pump 14 under normal operation would pump the water from the sump 16 and the water would be maintained at the level 54. During normal operation, the alarm device 10 is deactivated with the float 38 and float rod 30 in a lower position with the flange 34 supporting the rod 30 on top of the upper arm 22 of the guide 20.

Figure 3:
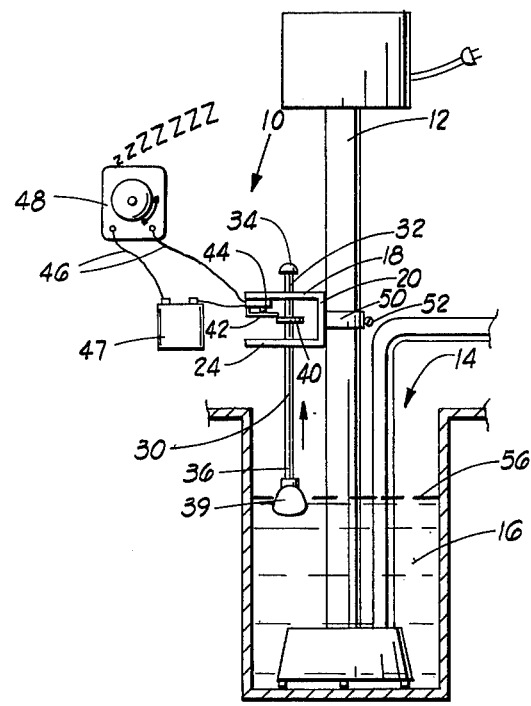
FIG. 3 is a side sectional view of the sump similar to FIG. 2, but with the float raised in the sump due to a raised water level and the switch closed thereby activating the alarm.

In FIG. 3 the device 10 can be seen activated due to the failure of the sump pump 14 from pumping the water from the sump 16. In this view the water has reached a water level 56 which is dangerously high and could cause an overflow of the sump 16 and flooding therefrom. Prior to the water overflowing from the sump 16, the device 10 is activated. As the water level rises, the float 38 begins floating on top of the water rising the vertical float rod 30 on the guide 18. As the float guide 30 rises, the switch lever trip 40 in turn rises contacting the switch lever 42. As the switch lever 42 is raised, it closes the microswitch 44. The closed microswitch 44 being wired to the battery 47 and alarm 48, activates the alarm 48 and alerts the operator of the sump pump 14. When the water level recedes in the sump 16, the float 38 in turn lowers thereby lowering the float rod 30. As the float rod 30 lowers, the switch lever trip 40 disengages the outwardly extending switch lever 42 and opens the microswitch 44. At this time the microswitch 44 then shuts off the alarm 48 thereby ending the alert.

Changes may be made in the construction and arrangement of the parts or elements of the embodiments as described herein without departing from the spirit or scope of the invention defined in the following claims:

What is claimed is:

1. A sump alarm device adapted for receipt on a vertical pump shaft of a sump pump, the sump pump disposed in a sump for pumping water therefrom, the device comprising:

a "U" shaped float rod guide having a vertical base with two outwardly extending horizontal arms, the arms including an upper arm and a lower arm, the upper arm and the lower arm having apertures therethrough;

a screw clamp adapted for receipt around the vertical pump shaft of the sump pump, said screw clamp attached to the vertical base of said float rod guide;

a vertical float rod slidably received through the apertures in the upper and the lower arms of said float rod guide;

a float mounted on the lower end of said float rod;

a microswitch attached to the upper arm of said rod guide and having a switch lever extending outwardly therefrom and disposed adjacent said float rod;

a switch lever trip mounted on said rod and disposed between the upper and lower arms of said rod guide, said switch lever trip disposed below said switch lever, said switch lever trip contacting said switch lever and closing said microswitch when said switch lever trip is raised on said rod; and a battery operated alarm electrically connected to said microswitch, said alarm activated when said switch is closed.

* * * * *